S. JOHNSTONE.
RESILIENT VEHICLE WHEEL.
APPLICATION FILED JUNE 8, 1914.

1,175,151.

Patented Mar. 14, 1916.

WITNESSES:
J. B. Webster
F. M. Blanchard

INVENTOR.
Samuel Johnstone
BY
Percy G. Webster
ATTORNEY

UNITED STATES PATENT OFFICE.

SAMUEL JOHNSTONE, OF SACRAMENTO, CALIFORNIA.

RESILIENT VEHICLE-WHEEL.

1,175,151.  Specification of Letters Patent.  Patented Mar. 14, 1916.

Application filed June 8, 1914. Serial No. 843,649.

*To all whom it may concern:*

Be it known that I, SAMUEL JOHNSTONE, a citizen of the United States, residing at Sacramento, in the county of Sacramento and State of California, have invented certain new and useful Improvements in Resilient Vehicle-Wheels; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in wheels and particularly to a device adapted to embody a supporting structure comprising a continuous rubber resilient member formed in one piece with an integral outer rubber rim, the supporting structure to be placed between a channel shaped rim on the felly of the wheel and such integral rubber rim, said rubber rim having side plates slidable over the sides of the channel shaped rim in such a manner and with such construction as to cause the supporting structure to sustain the weight of the felly and at the same time afford ample resiliency and elasticity between the inner and outer rims to compensate for and overcome the jolts and jars due to the wheels riding over uneven surfaces.

The device is further designed to be securely protected from external wear and contact, thus insuring a device which will be of durable construction and free from crystallization and one which will not be subject to the varying conditions due to expansion or contraction owing to heat or cold.

The device is further adapted to be disposed between the inner and outer rims under an expansive pressure, whereby it will sustain the load of the vehicle mounted on the wheels under all normal conditions.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1:
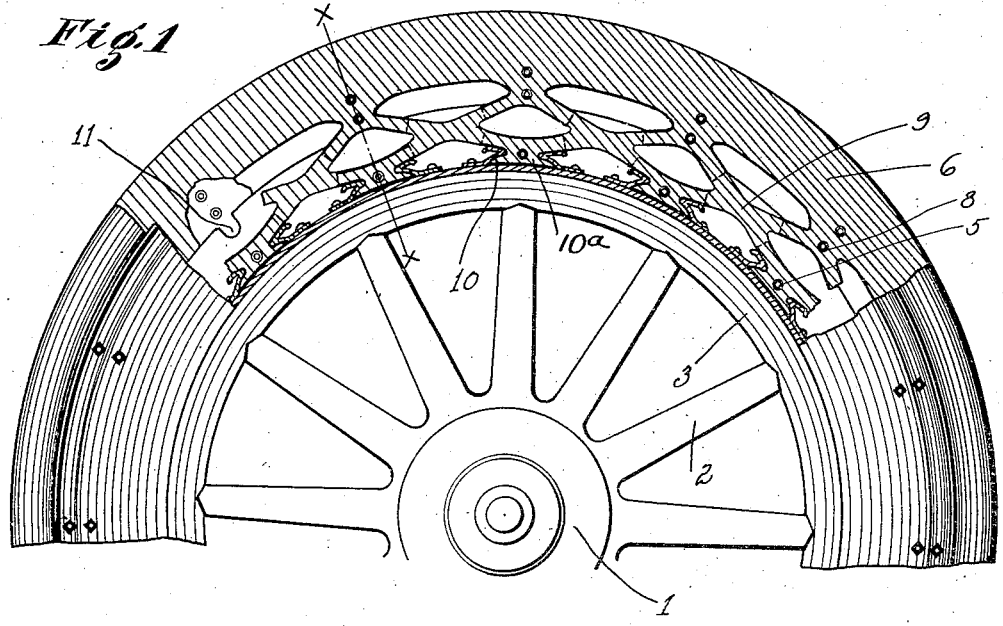
Figure 2:
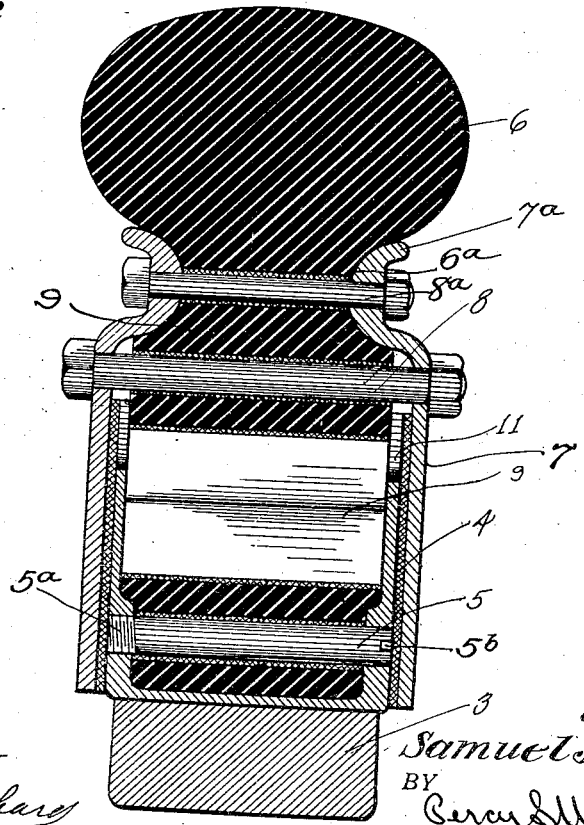

Figure 1 is a side elevation, partly broken out, of a portion of a wheel showing my improved structure. Fig. 2 is a sectional view of the rim of the wheel taken relatively on a line X—X of Fig. 1.

Referring now more particularly to the characters of reference on the drawings, the numeral 1 designates the hub of the wheel, 2, the spokes, and 3, the felly.

The numeral 4 designates the channel-shaped rim secured to the felly 3 and provided with the flush securing pins or bolts 5 for holding the rubber structure into connection with said rim 4 in a manner as will presently appear.

My improved rubber structure comprises an outer solid tire 6 having a contracted portion $6^a$ forming a neck. The numeral 7 designates side plates movable over the sides of the rim 4 and having inwardly extending curved upper edges $7^a$ bolted by means of bolts $8^a$ to the contracted portion $6^a$ of the tire 6. These portions $7^a$ form seats to support the solid tire 6 to prevent it from collapsing or being pressed too far downwardly between the side plates 7. The supporting rubber structure 9 is formed as a component part of the contracted portion $6^a$ and extends outwardly therefrom on each side to exactly fit between the channel-shaped rim 4 as shown clearly in a cross section view in Fig. 2. This portion 9 is secured to the side plates 7 by means of bolts 8 and is secured at its inner end to the rim 4 by means of pins 5 threaded at $5^a$ to screw into one side of the rim 4 and provided at its other end with a slot $5^b$ to receive a screwdriver or like tool, these pins 5 being prevented from coming out of position by means of the side plates 7 fitting thereover in the manner shown. The rubber structure is prevented from independent rotary movement within the rim 4 by means of lugs 10 secured to the channel-shaped rim 4 between which extend projecting flanged members $10^a$ on the supporting structure 9.

The rubber supporting structure 9, as can be plainly seen in Fig. 1, consists of webs extending diagonally from the rubber tire and arranged in pairs, the member of each pair intersecting each other and being formed into a component part at the intersection, the adjacent inner ends of adjacent pairs being formed into component members provided with projecting flanges 10ᵃ, the members 10 on the channel shaped rim being engageable with the flanges 10ᵃ to prevent independent rotary motion of the said rubber tire and supporting structure.

In this improved structure, the sides of the rim 4 extend to a point adjacent the bolts 8 and are recessed, as at 11, to allow of the radial movement of the outer rim, such bolts 8 moving into the recess 11 when this action takes place. The rubber construction 9 fits closely between the sides of the rim 4, in the manner shown in Fig. 2, which strengthens the device laterally, which is necessary for successful operation.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention what I claim as new and useful and desire to secure by Letters Patent is:—

A device of the character described comprising the combination with a wheel having a channel shaped rim, of a solid rubber tire spaced from said channel shaped rim and provided with side plates movable over the sides of said channel shaped rim, a rubber supporting structure interposed between said solid tire and said channel shaped rim, such rubber supporting structure comprising webs extending diagonally from the rubber tire and arranged in pairs, the members of each pair intersecting each other and being formed into a component part at the intersection, the adjacent inner ends of adjacent pairs being formed into component members provided with projecting flanges and means on the channel shaped rim engageable with said flanges to prevent independent rotary motion of the said rubber tire and supporting structure, as described.

In testimony whereof I affix my signature in presence of two witnesses.

SAMUEL JOHNSTONE.

Witnesses:
   Louis Camman,
   Elijah Brown.